(12) United States Patent
Erickson, Jr. et al.

(10) Patent No.: US 9,164,525 B2
(45) Date of Patent: *Oct. 20, 2015

(54) THIN-FILM PHOTOVOLTAIC POWER ELEMENT WITH INTEGRATED LOW-PROFILE HIGH-EFFICIENCY DC-DC CONVERTER

(75) Inventors: Robert W. Erickson, Jr., Boulder, CO (US); Steven Croft, Menlo Park, CA (US); Shawn Everson, Fremont, CA (US); Aaron Schultz, San Jose, CA (US)

(73) Assignee: APOLLO PRECISION FUJIAN LIMITED, Quanzhou (CN)

( * ) Notice: Subject to any disclaimer, the term of this patent is extended or adjusted under 35 U.S.C. 154(b) by 847 days.

This patent is subject to a terminal disclaimer.

(21) Appl. No.: 13/251,333

(22) Filed: Oct. 3, 2011

(65) Prior Publication Data
US 2012/0025618 A1 Feb. 2, 2012

Related U.S. Application Data

(63) Continuation of application No. 12/379,197, filed on Feb. 13, 2009, now Pat. No. 8,058,752.

(51) Int. Cl.
| | |
|---|---|
| G05F 1/67 | (2006.01) |
| H02M 3/158 | (2006.01) |
| H02M 7/00 | (2006.01) |
| H02J 1/00 | (2006.01) |

(52) U.S. Cl.
CPC .............. *G05F 1/67* (2013.01); *H02M 3/1582* (2013.01); *H02M 7/003* (2013.01); *Y02E 10/58* (2013.01); *Y10T 307/685* (2015.04); *Y10T 307/707* (2015.04)

(58) Field of Classification Search
USPC ............................................................ 307/82
See application file for complete search history.

(56) References Cited

U.S. PATENT DOCUMENTS

| | | | |
|---|---|---|---|
| 5,348,589 A | 9/1994 | Arai et al. | |
| 6,081,104 A | 6/2000 | Kern | |
| 6,093,884 A | 7/2000 | Toyomura et al. | |
| 6,169,678 B1 | 1/2001 | Kondo et al. | |
| 6,300,158 B1 * | 10/2001 | Simburger et al. | ............. 438/59 |
| 6,593,521 B2 | 7/2003 | Kobayashi | |
| 6,963,147 B2 | 11/2005 | Kurokami et al. | |
| 7,812,247 B2 | 10/2010 | Armstrong et al. | |
| 7,834,580 B2 | 11/2010 | Haines | |
| 7,843,085 B2 | 11/2010 | Ledenev et al. | |

(Continued)

FOREIGN PATENT DOCUMENTS

| | | | |
|---|---|---|---|
| JP | 2002-111038 A | 4/2002 | |
| JP | 2002-141540 A | 5/2002 | |

(Continued)

OTHER PUBLICATIONS

International Preliminary Report on Patentability issued in PCT Application PCT/US2010/023766, mailed on Aug. 25, 2011.

(Continued)

*Primary Examiner* — Robert Deberadinis
(74) *Attorney, Agent, or Firm* — The Marbury Law Group PLLC

(57) ABSTRACT

A photovoltaic device includes at least one photovoltaic cell and a DC/DC converter electrically coupled to the at least one photovoltaic cell. The at least one photovoltaic cell and the DC/DC converter are integrated into a photovoltaic package.

40 Claims, 9 Drawing Sheets

(56) References Cited

U.S. PATENT DOCUMENTS

| | | | |
|---|---|---|---|
| 7,900,361 B2 | 3/2011 | Adest et al. | |
| 8,058,752 B2 * | 11/2011 | Erickson et al. | 307/150 |
| 2002/0014262 A1 | 2/2002 | Matsushita et al. | |
| 2005/0139259 A1 | 6/2005 | Steigerwald et al. | |
| 2007/0283996 A1 | 12/2007 | Hachtmann et al. | |
| 2007/0283997 A1 | 12/2007 | Hachtmann et al. | |
| 2008/0000518 A1 | 1/2008 | Basol | |
| 2008/0053519 A1 | 3/2008 | Pearce et al. | |
| 2008/0142071 A1 | 6/2008 | Dorn et al. | |
| 2008/0143188 A1 | 6/2008 | Adest et al. | |
| 2008/0144294 A1 | 6/2008 | Adest et al. | |
| 2008/0147335 A1 | 6/2008 | Adest et al. | |
| 2008/0150366 A1 | 6/2008 | Adest et al. | |
| 2008/0164766 A1 | 7/2008 | Adest et al. | |
| 2008/0266919 A1 * | 10/2008 | Mallwitz | 363/124 |
| 2008/0314432 A1 | 12/2008 | Paulson et al. | |
| 2009/0014049 A1 | 1/2009 | Gur et al. | |
| 2009/0014057 A1 | 1/2009 | Croft et al. | |
| 2009/0014058 A1 | 1/2009 | Croft et al. | |

FOREIGN PATENT DOCUMENTS

| | | | |
|---|---|---|---|
| JP | 2003-052185 A | 2/2003 | |
| JP | 2003-124492 A | 4/2003 | |
| JP | 2004-096090 A | 3/2004 | |
| JP | 2004253475 A | 9/2004 | |
| JP | 2005-129773 A | 5/2005 | |

OTHER PUBLICATIONS

U.S. Appl. No. 12/314,519, filed Dec. 11, 2008, Hollars et al.
U.S. Appl. No. 12/379,196, filed Feb. 13, 2009, Erickson et al.
Achille et al., "Optimized DC-AC Boost Converters for Modular Photovoltaic Grid-Connected Generators," IEEE International Symposium on Industrial Electronics, 2004 Record, vol. 2, pp. 1005-1010, May 2004.
Alonso et al., "Cascaded H-Bridge Multilevel Converter for Grid Connected Photovoltaic Generators with Independent Maximum Power Point Tracking of Each Solar Array," IEEE Power Electronics Specialists Conference, 2003 Record, vol. 2, pp. 731-735, Jun. 2003.
Asiminoaei et al., "A Digitally Controlled PV-Inverter with Grid Impedance Estimation for ENS Detection," IEEE Transactions on Power Electronics, vol. 20, No. 6, pp. 1480-1490, Nov. 2005.
Athalye et al., "DSP implementation of a single-cycle predictive current controller in a boost PFC rectifier," IEEE Applied Power Electronics Conference and Exposition 2005, vol. 2, pp. 837-842, Mar. 6-10, 2005.
Calais et al., "Inverters for Single-Phase Grid-Connected Photovoltaic Systems—An Overview," IEEE Power Electronics Specialists Conference, 2002 Record, vol. 4, pp. 1995-2000, Jun. 2002.
Carrasco et al., "Power Electronic Systems for the Grid Integration of Renewable Energy Sources: A Survey," IEEE Transactions on Industrial Electronics, vol. 53, No. 4, pp. 1002-1016, Aug. 2006.
Chen et al., "A New Low-Stress Buck-Boost Converter for Universal-Input PFC Applications," *IEEE Applied Power Electronics Conference*, Feb. 2001.
Chen et al., "Predictive digital current programmed control," IEEE Transactions on Power Electronics, Jan. 2003, vol. 18, issue 1, part 2, pp. 411-419.
Cocconi et al., "High-Frequency Isolated 4kW Photovoltaic Inverter for Utility Interface," Proc. Power Conversion International 1983 Conference (PCI'83), Sep. 1983.
Enslin et al., "Integrated Photovoltaic Maximum Power Point Tracking Converter," IEEE Transactions on Industrial Electronics, vol. 44, No. 6, pp. 769-773, Dec. 1997.
Femia et al., "Optimization of Perturb and Observe Maximum Power Point Tracking Method," IEEE Transactions on Power Electronics, vol. 20, No. 4, pp. 963-973, Jul. 2005.
Fukae et al., "Proposal of Unique PV System for Large-Scale Photovoltaic Power Generation System," Third World Conference on Photovoltaic Energy Conversion, pp. 2815-2820, May 2003.
Herrmann et al., "Low Cost DC to AC Converter for Photovoltaic Power Conversion in Residential Applications," IEEE Power Electronics Specialists Conference, 1993 Record, pp. 588-594, Jun. 1993.
Ho et al., "An Integrated Inverter with Maximum Power Tracking for Grid-Connected PV Systems," IEEE Transactions on Power Electronics, vol. 20, No. 4, pp. 953-962, Jul. 2005.
IEEE Standard 1547, "IEEE Standard for Interconnecting Distributed Resources with Electric Power Systems," Jul. 28, 2003.
Kjaer et al., "A Review of Single-Phase Grid-Connected Inverters for Photovoltaic Modules," IEEE Transactions on Industry Applications, vol. 41, No. 5, pp. 1292-1306, Sep./Oct. 2005.
Meinhardt et al., "Miniaturized 'Low Profile' Module Integrated Converter for Photovoltaic Applications with Integrated Magnetic Components," IEEE Applied Power Electronics Conference, 1999 Record, pp. 305-311, vol. 1, Mar. 1999.
Meza et al., "Boost-Buck Inverter Variable Structure Control for Grid-Connected Photovoltaic Systems with Sensorless MPPT," IEEE ISIE 2005, pp. 657-662.
Myrzik et al., "String and Module Integrated Inverters for Single-Phase Grid-Connected Photovoltaic Systems—A Review," IEEE Bologna PowerTech Conference Proceedings, vol. 2, Jun. 2003.
Peng et al., "Digital current-mode controller for DC-DC converters," IEEE Applied Power Electronics Conference and Exposition 2005, vol. 2, pp. 899-905, Mar. 6-10, 2005.
Shah et al., "Photovoltaic Technology: The Case for Thin-Film Solar Cells," Science, vol. 285, pp. 692-698, Jul. 30, 1999.
Shimizu et al., "Flyback-Type Single-Phase Utility Interactive Inverter with Power Pulsation Decoupling on the DC Input for an AC Photovoltaic Module System," IEEE Transactions on Power Electronics, vol. 21, No. 5, pp. 1264-1272, Sep. 2006.
Shimizu et al., "Generation Control Circuit for Photovoltaic Modules," *IEEE Transactions on Power Electronics*, vol. 16, No. 3, pp. 293-300, May 2001.
Shmilovitz, D., "Photovoltaic Maximum Power Point Tracking Employing Load Parameters," *IEEE International Symposium on Industrial Electronics*, 2005 Proceedings, pp. 1037-1042, Jun. 2005.
Tse et al., "A Novel Maximum Power Point Tracker for PV Panels Using Switching Frequency Modulation," IEEE Transactions on Power Electronics, vol. 17, No. 6, pp. 980-989, Nov. 2002.
U.S. FCC Regulations Part 15, Aug. 14, 2006.
van der Merwe et al., "Universal Converter for DC PV Water Pumping Systems," *IEEE International Symposium on Industrial Electronics*, 1998 Proceedings, vol. 1, pp. 214-217, Jul. 1998.
Veerachary et al., "Voltage-Based Maximum Power Point Tracking Control of PC System," IEEE Transactions on Aerospace and Electronic Systems, vol. 38, No. 1, pp. 262-270, Jan. 2002.
Walker et al., "Cascaded DC-DC Converter Connection of Photovoltaic Modules," *IEEE Transactions on Power Electronics*, vol. 19, No. 4, pp. 1130-1139, Jul. 2004.
Walker et al., "Photovoltaic DC-DC Module Integrated Converter for Novel Cascaded and Bypass Grid Connection Topologies—Design and Optimisation," IEEE Power Electronics Specialists Conference, 2006 Record, Jun. 2006.
Walker et al., "PV String Per-Module Maximum Power Point Enabling Converters," Australasian Universities Power Engineering Conference, 2003.
International Search Report and Written Opinion of the International Search Authority, International Application PCT/US2010/023766. International Search Authority—Korean Intellectual Patent Office (ISA/KR), Sep. 28, 2010.
Kusakawa, et al., "Further Improvement of a Transformerless, Voltage-Boosting Inverter for AC Modules," Solar Energy Material & Solar Cells, vol. 67, Issue 1-4, pp. 379-387, Mar. 31, 2001.
G. Kern, "SunSine300: Manufacture of an AC Photovoltaic Module," NREL, Mar. 1999, 33pgs.

\* cited by examiner

US 9,164,525 B2

THIN-FILM PHOTOVOLTAIC POWER ELEMENT WITH INTEGRATED LOW-PROFILE HIGH-EFFICIENCY DC-DC CONVERTER

BACKGROUND

The present invention is directed generally to photovoltaic systems and more specifically to a photovoltaic element with an integrated DC/DC converter.

Development of new technologies for low-cost manufacturing of thin-film photovoltaic (PV) power cells is enabling new types of building materials that integrate photovoltaic power generating elements. In this role, the photovoltaic modules become architectural elements, requiring properties such as a low profile, ease of connection to the utility system, and the ability to maximize energy capture in a complex physical environment having shadows, reflections, and differing orientations.

An example is the residential roof shingle, where it is desired that the photovoltaic modules have the appearance of asphalt shingles. To maximize energy capture on a complex multifaceted roof, smart controllers are required that can track PV peak power points on a fine scale.

SUMMARY

One embodiment relates a photovoltaic device. The photovoltaic device includes at least one photovoltaic cell and a DC/DC converter. The DC/DC converter can be electrically coupled to the at least one photovoltaic cell. The at least one photovoltaic cell and the DC/DC converter are integrated into a photovoltaic package.

Another embodiment relates to a method of operating a photovoltaic module. A photovoltaic cell power output is provided to a DC/DC converter having at least two transistors. The at least two transistors are switched only when a string current is not in a nominal range. A voltage is provided to a string connection of the DC/DC converter.

Another embodiment relates to a photovoltaic converter circuit. The circuit includes at least one photovoltaic cell and a DC/DC converter. The DC/DC converter includes a buck converter, a boost converter, and a pass-through. The buck converter includes at least one first transistor. The boost converter includes at least one second transistor. The buck converter is electrically coupled to the boost converter. The DC/DC converter is electrically coupled to the at least one photovoltaic cell.

Another embodiment relates to a photovoltaic system. The photovoltaic system includes an inverter and at least two photovoltaic modules. Each of the at least two photovoltaic modules include at least one photovoltaic cell and a DC/DC converter. The DC/DC converter is electrically coupled to the at least one photovoltaic cell. The DC/DC converter includes a pass-through. The DC/DC converters of the at least two photovoltaic modules are electrically connected in series with the inverter.

Another embodiment relates to a method of operating a photovoltaic system. A plurality of photovoltaic modules in series provide a power output. At least one of the plurality of photovoltaic modules operates in a pass-through mode. At least one of the plurality of photovoltaic modules operates in a boost mode. At least one of the plurality of photovoltaic modules operates in a buck mode. A substantially constant string voltage is provided to an inverter. At other times, optionally, the plurality of photovoltaic modules all operate in pass-through mode.

DETAILED DESCRIPTION

A device, method, and circuit of a photovoltaic power element module are described. In the following description, for purposes of explanation, numerous specific details are set forth to provide a thorough understanding of exemplary embodiments of the invention. It will be evident, however, to one skilled in the art that the invention may be practiced without these specific details. The drawings are not to scale. In other instances, well-known structures and devices are shown in simplified form to facilitate description of the representative embodiments.

Since thin-film PV cells can be very thin and lightweight, it is desirable that smart controllers be thin and lightweight as well. Integration of a smart controller directly into a photovoltaic panel is challenging because of the high ambient temperatures encountered, as well as the very low profile required. Hence, a new system configuration and power converter approach that can operate with high efficiency while meeting size (low profile) requirements is desired. A thin-film photovoltaic module for building-integrated applications, having local low-profile dc-dc converters integrated into a package such as a laminate, providing maximum power point tracking on a fine scale, interfacing to a dc output, and operating with high efficiency is described.

Figure 1:
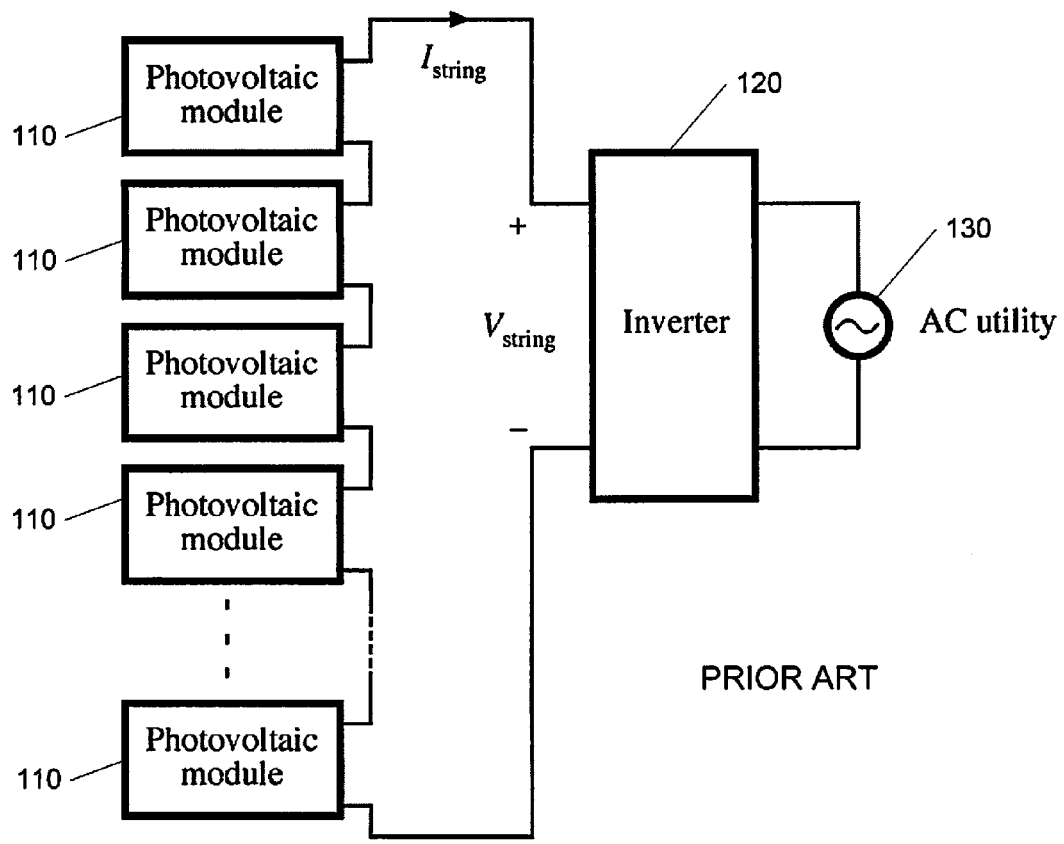
FIG. 1 is a diagram of a series string of photovoltaic modules connected to a central inverter in accordance with a prior art embodiment.

Photovoltaic cells produce direct current (DC) voltage of a fraction of a volt, while the utility system wiring within buildings typically employs alternating current (AC) voltages greater than 100 V. Thus, the voltage must be increased and changed to AC form. Referring to FIG. 1, a diagram of a series string of photovoltaic modules connected to a central inverter in accordance with a prior art embodiment is shown. Photovoltaic modules 110 are connected in series with an input of an inverter 120. An output of the inverter 120 is connected to an AC utility 130. The photovoltaic modules 110 can include multiple photovoltaic cells connected in series. Optionally, the photovoltaic cells include backplane or bypass diodes. The photovoltaic modules 110 produce a low-voltage DC output of typically several tens of volts. The photovoltaic modules 110 are connected in series, to achieve a high-voltage DC $V_{string}$ that is connected to the input terminals of the inverter 120. The inverter 120 produces AC as required to interface to the AC utility 130.

Figure 2:
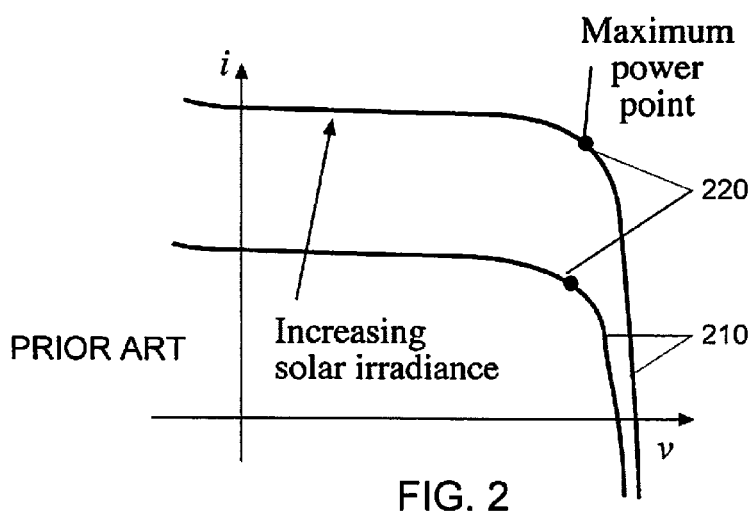
FIG. 2 is a graph of a current-voltage curve of a typical photovoltaic cell in accordance with a prior art embodiment.

Referring to FIG. 2, a graph of a current-voltage curve of a typical photovoltaic cell in accordance with a prior art embodiment is shown. When illuminated, photovoltaic cells exhibit a current-voltage (i-v) characteristic 210. The power generated by the cell is maximized at a certain voltage and current known as a maximum power point 220. The current and voltage at the maximum power point 220 vary with solar irradiance, as well as with other factors such as orientation, aging, temperature, etc. To maximize energy capture, it is desirable to operate every cell at its maximum power point 220.

Referring again to FIG. 1, when photovoltaic modules 110 are connected in a series string, they operate with the same current $I_{string}$. If all photovoltaic modules 110 are identical, then it is possible for a maximum power point tracking controller within the inverter 120 to select the current $I_{string}$ such that each of the photovoltaic modules 110 operates at its maximum power point. However, when factors such as shadows, shading, reflections, temperature differences, and differing orientations cause the current-voltage characteristics of the photovoltaic modules 110 to vary, then the cell maximum power points can occur at different currents, and there is no single choice of $I_{string}$ that causes each of the photovoltaic modules 110 of the series-connected string to produce its maximum possible power.

A typical example is the partial shading of a series-connected string of photovoltaic cells. In this case, the shaded cells are not capable of producing as much current as the fully illuminated cells. The maximum power points of cells in the series string occur at different currents, and there is no single current $i=I_{string}$ that causes every cell to generate its maximum power. Smaller scale control is desired that can operate smaller blocks of photovoltaic cells at or nearer their maximum power points, where the smaller blocks have an optimal current different than the series string current $I_{string}$.

Figure 3:
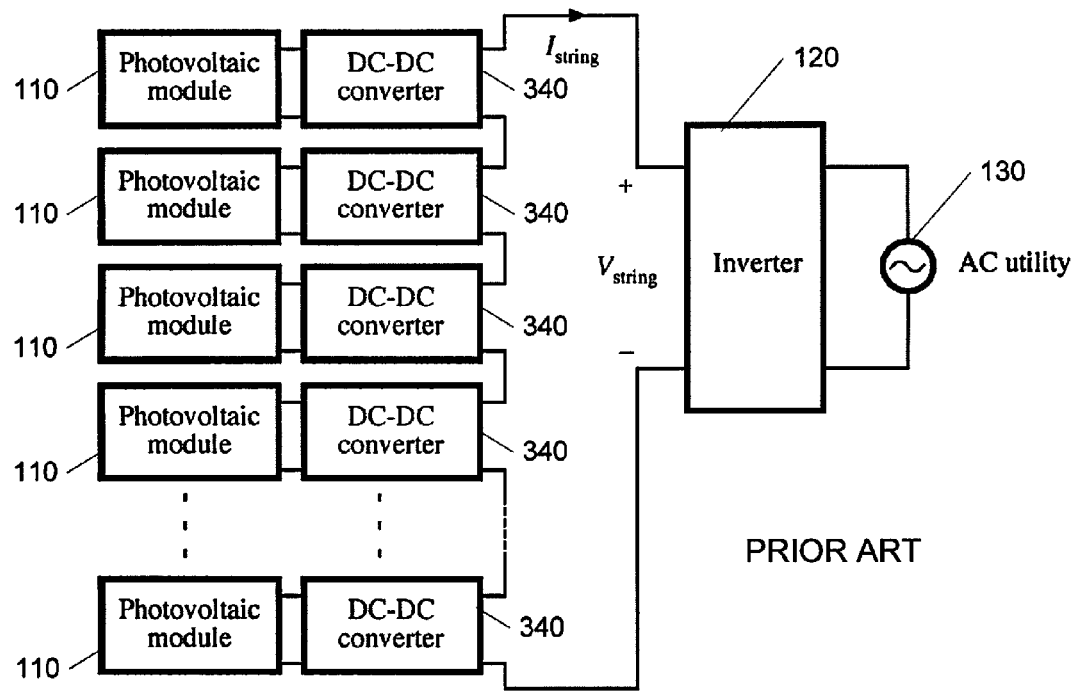
FIG. 3 is a diagram of a series string of photovoltaic modules with local DC/DC converters connected to a central inverter in accordance with a prior art embodiment.

Referring to FIG. 3, a diagram of a series string of photovoltaic modules 110 with local DC/DC converters 340 connected to a central inverter 120 in accordance with a prior art embodiment is shown. The photovoltaic modules 110 are each connected to a DC/DC converter 340. The DC/DC converters 340 are connected in series with an input of an inverter 120. An output of the inverter 120 is connected to an AC utility 130. The DC/DC converters 340 allow the current of the individual photovoltaic modules 110 to differ from the string current.

The DC/DC converters 340 can be buck, boost, and single-switch buck-boost converters or a combination thereof. However, the single-switch buck-boost type converters have lower efficiencies. As used herein, "buck" and "boost" converters mean any converter that decrease and increase the voltage respectively, and include buck converter circuits, boost converter circuits, SEPIC converter circuits, and Cuk converter circuits. The DC/DC converters 340 are designed to operate with a range of duty cycles, for example, approximately 1.5:1-3:1, with the nominal operating point occurring near the middle of the range. The total voltage produced by the string of DC/DC converters 340 can vary widely with operating point. The total string voltage of the DC/DC converters 340 is fed into the inverter 120 for interface to the AC utility 130. However, the series string of photovoltaic modules 110 with local DC/DC converters 340 connected to a central inverter 130 has losses and relatively low efficiency. The added losses incurred at full power may offset the added energy captured under partially shaded conditions, negating any advantages.

Figure 4:
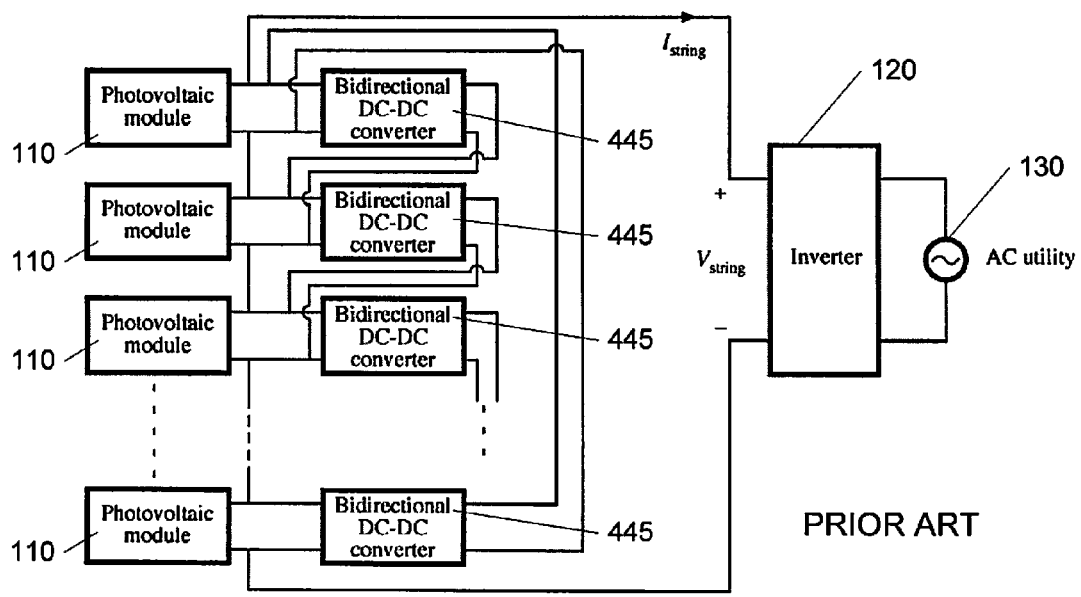
FIG. 4 is a diagram of a series string of photovoltaic modules with local bidirectional DC/DC converters connected to a central inverter in accordance with a prior art embodiment.

In another prior art embodiment, a "shuffle" approach is employed. Referring to FIG. 4, a diagram of a series string of photovoltaic modules with local bidirectional DC/DC converters connected to a central inverter in accordance with a representative embodiment is shown. The photovoltaic modules 110 are each connected to a bidirectional DC/DC converter 445. The bidirectional DC/DC converters 445 are connected in series with an input of an inverter 120. An output of the inverter 120 is connected to an AC utility 130. If all photovoltaic modules are identical, then no current flows through the bidirectional DC/DC converters 445 (i.e. the "shuffle" converters); this leads to desirable high efficiency at full power.

A partially shaded photovoltaic module 110 will require less current than $I_{string}$. The excess current will flow through the "shuffle" converters. An isolated and bidirectional DC/DC converter 445 converter is connected between the top and bottom photovoltaic modules 110. This approach is effective in addressing the problem of efficiency at full power, but requires more complex interconnections and bidirectional DC/DC converters 445. It also has the disadvantage of requiring an isolated and bidirectional DC/DC converter 445 to terminate the string.

In one representative embodiment, the power transistors of an integrated DC/DC converter switch only when needed. The photovoltaic element module provides a new type of photovoltaic dc power module, to meet the needs of building-integrated photovoltaic systems. The photovoltaic element module includes an array of series-connected thin-film photovoltaic cells, an in-package, low-profile, high-efficiency DC/DC converter, and an in-package controller. The DC/DC converter and its controller allow maximum power point tracking on a fine scale, and interfacing the photovoltaic element modules to a series string. The photovoltaic element modules employ a dc-dc converter that switches the power transistors (which incurs power loss) only when needed—i.e., only when there are variations in module i-v characteristics.

When all photovoltaic element modules have identical i-v characteristics, the DC/DC converters connect their respective modules directly to the string. Switching of the DC/DC converter power transistors is employed only when needed to change the voltage or current magnitudes in response to variations in photovoltaic module i-v characteristics. Thus, the photovoltaic element module improves energy capture in the complex physical environments that may be encountered in building-integrated photovoltaic systems.

Figure 5:
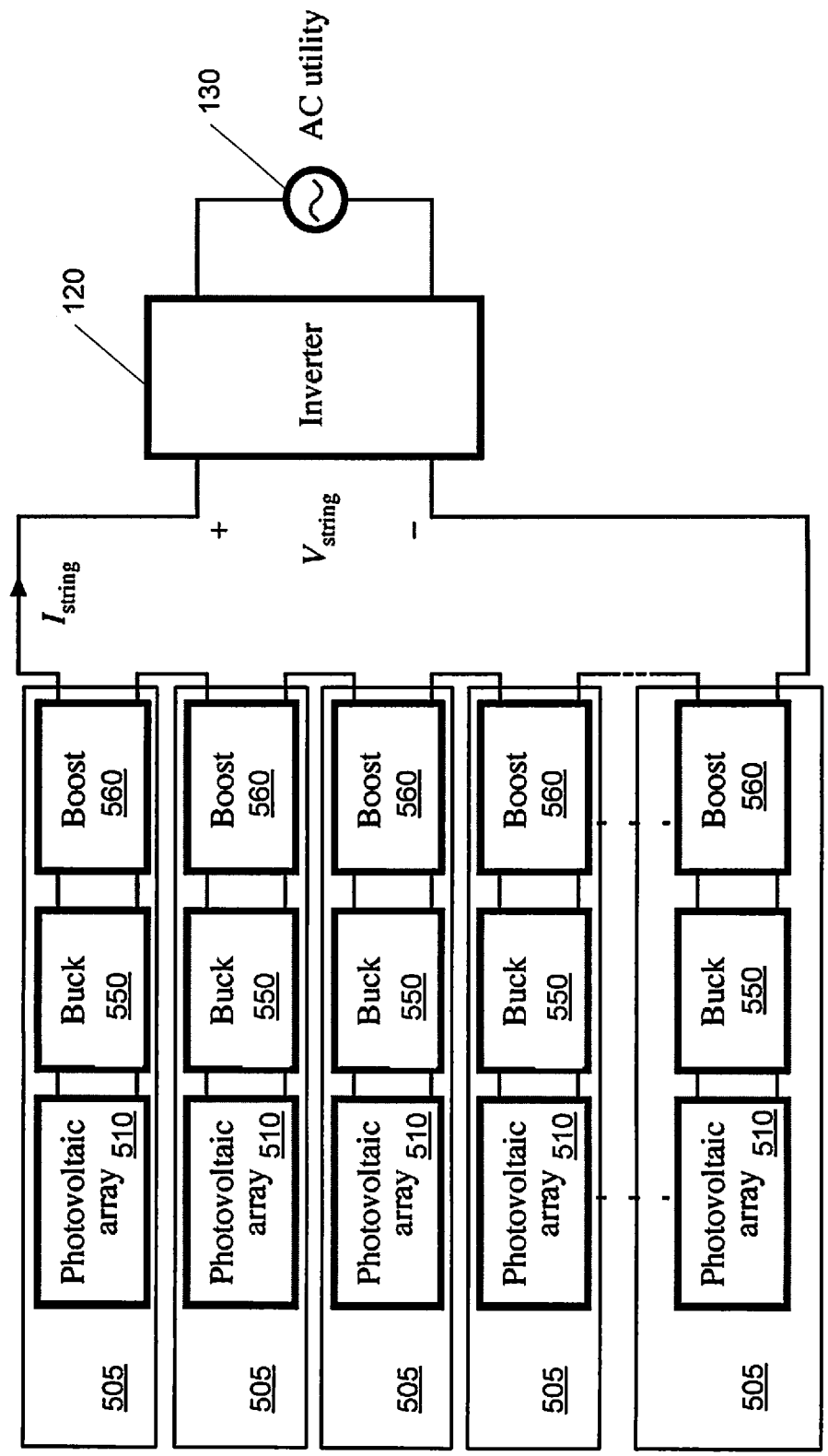
FIG. 5 is a diagram of a series string of photovoltaic element modules with integrated DC/DC converters connected to a central inverter in accordance with a representative embodiment.

Referring to FIG. 5, a diagram of a series string of photovoltaic element modules with integrated DC/DC converters connected to a central inverter in accordance with a representative embodiment is shown. The photovoltaic element modules 505 are each connected in series with an input of an inverter 120. An output of the inverter 120 is connected to an AC utility 130. The photovoltaic element modules 505 each include a photovoltaic array 510, a buck converter 550, and a boost converter 560. The photovoltaic module 510 is connected to the buck converter 550; and the buck converter 550 is connected to the boost converter 560. The output of the boost converter 560 is connected to the output of the photovoltaic element module 505. The photovoltaic array 510 can include multiple photovoltaic cells connected in series. Optionally, the photovoltaic cells include backplane or bypass diodes. The photovoltaic array 510 produces a low-voltage DC output of typically several tens of volts.

It is desired to operate the string of photovoltaic element modules 505 with an approximately constant total output voltage, allowing better optimization of the central inverter 120. This can be achieved through DC/DC converters capable of both buck (voltage step-down) and boost (voltage step-up) operation. Under balanced conditions, the converter connects the photovoltaic array 510 of the photovoltaic element module 505 directly to the string. When a module is partially shaded, the module's current will be less than the string current. Its DC/DC converter operates in buck mode. Buck mode buffers the lower current photovoltaic module such that the converter output current equals the higher string current. Buck mode also results in a lower contribution of voltage to the total string voltage. When a module is fully illuminated but other modules in the same string are shaded, then its DC/DC converter operates in boost mode. In boost mode, the converter helps to buffer the higher current photovoltaic module such that the converter output current equals the lower string current. Boost mode also results in a higher contribution of voltage to the total string voltage. With this mix of buck and boost operation amidst DC/DC converters in a string of photovoltaic element modules 505, it is possible for the string total output voltage to remain constant. This behavior can be achieved using autonomous local module controllers that adjust their duty cycles to produce a constant power characteristic at the converter output. The central inverter may then adjust its average (DC) input current to the value that results in the desired total string voltage.

It is further desired that the maximum power point tracking algorithms of the individual photovoltaic element modules 505 be independent and non-interacting. One way to achieve this is by addition of a feedback loop that regulates the voltage or current of the photovoltaic array to follow a reference provided by a maximum power point tracker. This feedback loop produces the changes in converter duty cycle necessitated by changes in other modules of the series string, freeing the maximum power point tracker of this function. This significantly improves the system dynamic performance.

Traditionally, inverters or converters are typically in enclosures that are physically removed from the photovoltaic panels, with interconnecting wiring. Prior art references to "integrated" converter modules refer to mounting of a converter box on the back of the photovoltaic module to eliminate the interconnecting wiring. The embodiments of the present invention lead to a new level of integration, in which a very low profile DC/DC converter is constructed directly in the package of a thin-film photovoltaic module. This enables new architectural building materials for integration of smart systems of photovoltaic power sources into buildings.

Figure 6:
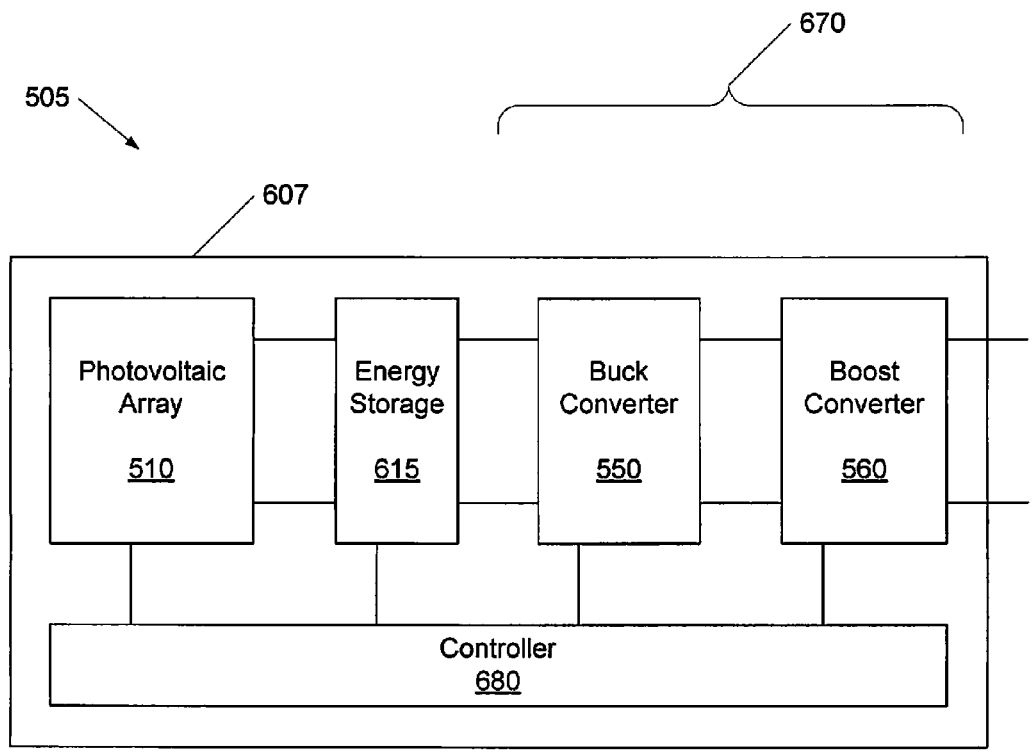
FIG. 6 is a diagram of the photovoltaic element module of FIG. 5 in accordance with a representative embodiment.

Referring to FIG. 6, a diagram of the photovoltaic element module 505 of FIG. 5 in accordance with a representative embodiment is shown. The photovoltaic element module 505 is integrated into a photovoltaic package 607. The photovoltaic element module 505 includes a photovoltaic array 510, an energy storage device, such as a capacitor 615 or another storage device, a DC/DC converter 670, and a controller 680. The DC/DC converter 670 can include a buck converter 550 and a boost converter 560 or a buck-boost converter. The controller 680 controls the DC/DC converter 670 using, for example, input from the a photovoltaic array 510 and/or the capacitor 615. Optionally, the DC/DC converter 670 can include an electromagnetic interference (EMI) filter (not shown). A plurality of photovoltaic element modules 505 can be electrically connected in series to an inverter (not shown) that typically includes filtering. The inverter can be connected to an AC utility (not shown) including transient protection (not shown). Preferably, the photovoltaic element module 505 does not include an EMI filter or an inverter.

The term package includes devices, such as the photovoltaic cells and circuit elements, such as converters, enclosed between a front barrier and a back barrier. The front barrier is transparent to solar radiation. The front barrier may comprise glass, plastic and/or encapsulant. The back barrier may comprise one or more glass, plastic and/or metal layers in a laminate or a plastic molded back piece. Examples of a package include devices laminated between sheets of plastic or polymer material, such as polyethylene terephthalate (PET) and/or ethylene vinyl acetate (EVA) sheets; devices attached to a substrate, where at least some of the devices may be encapsulated in epoxy; and devices sealed between a sheet of glass and a substrate (such as a glass or molded plastic substrate) and/or a sheet of plastic. In a monolithic integration of a package, a single substrate can have multiple cells formed on it. This substrate may or may not be used as part of the structure of the module package. Alternatively, the substrate is omitted and the cells "float" in the encapsulant between the front and back barriers. The encapsulant fills the spaces between the devices and the barrier layers. Alternatively, the space(s) between the barrier layers is filled with air or gas, as in a double paned window.

A package can include multiple layers of different materials. A low profile package preferably has a height less than or equal to 11 mm such as 3 mm-11 mm; for example, 3 mm-6 mm; specifically, 5 mm-6 mm.

Figure 7A:
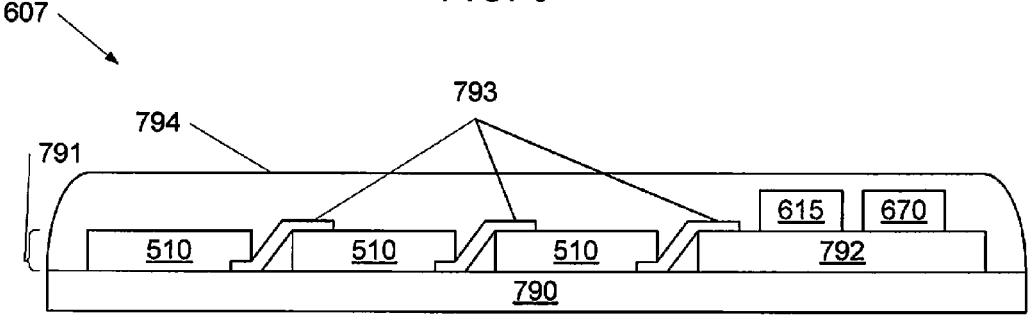
FIG. 7A is a side view of a first photovoltaic package of FIG. 6 in accordance with a representative embodiment.
Figure 7B:
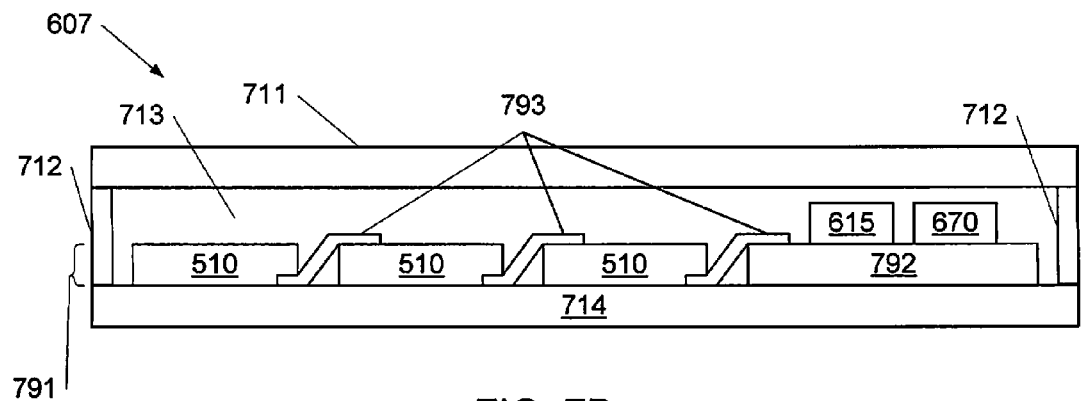
FIG. 7B is a side view of a second photovoltaic package of FIG. 6 in accordance with a representative embodiment.
Figure 7C:
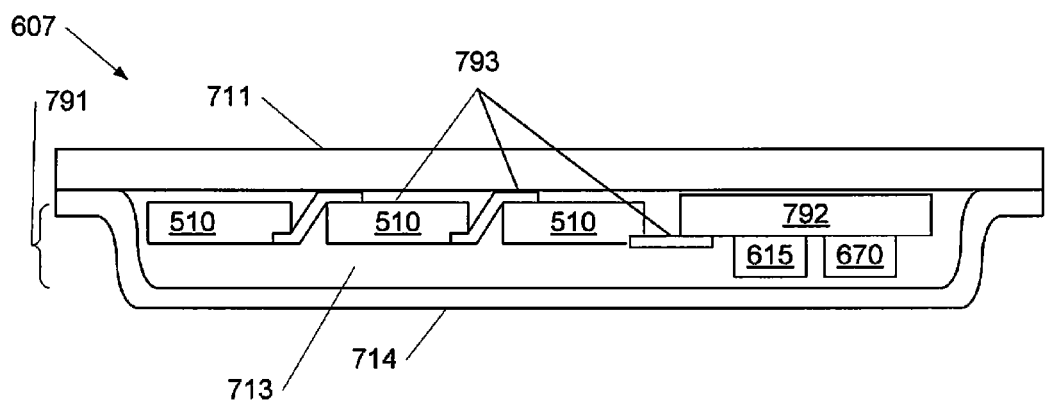
FIG. 7C is a side view of a third photovoltaic package in accordance of FIG. 6 with a representative embodiment.
Figure 7D:
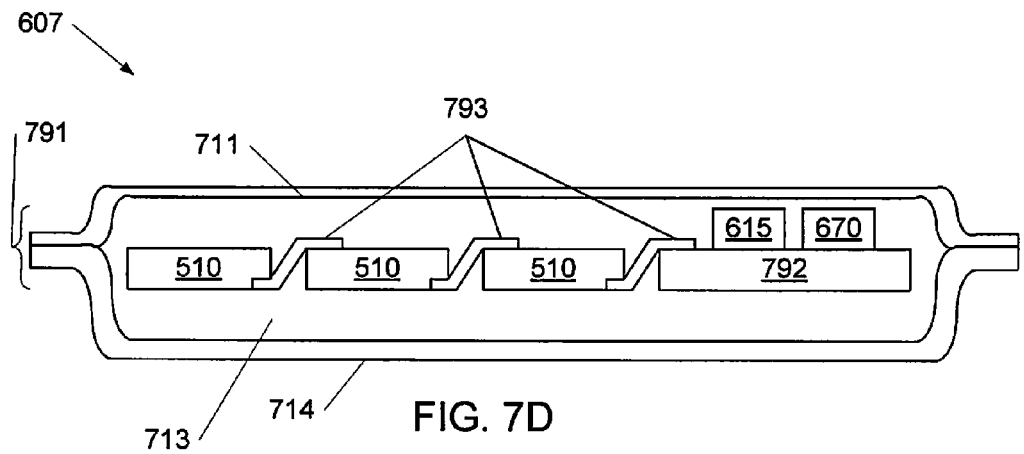
FIG. 7D is a side view of a fourth photovoltaic package in accordance of FIG. 6 with a representative embodiment.

Referring to FIG. 7A-D, side views of various photovoltaic packages of FIG. 6 in accordance with a representative embodiment are shown. The photovoltaic package 607 may comprise a low-profile photovoltaic laminate or non-laminate package. A laminate comprises multiple layers of materials formed together, such as cells 510 and DC/DC converter 670 on the substrate encapsulated between two polymer or plastic sheets, as shown in FIG. 7D. The low-profile photovoltaic laminate has a width-to-thickness ratio of about 30:1 to about 607:1 at its smallest width and the height is less than or equal to 11 mm. In other embodiments, the thickness is less than 11 mm; such as 3 mm-11 mm; for example, 3 mm-6 mm; specifically, 5 mm-6 mm. In a representative embodiment, the photovoltaic package 607 is about the size of a typical three-tab residential roofing shingle. Alternatively, the photovoltaic package 607 can be a long sheet such as a roll of photovoltaic roofing material laminated on both sides. The roll of laminated photovoltaic module material can be cut to length. The photovoltaic package 607 can be any low-profile form and in any shape. Alternatively, the photovoltaic package 607 can be a non-laminate type package such as a glass sheet covered package where the electrical components are encapsulated in a polymer encapsulant.

The photovoltaic package 607 comprises a device layer 791 and front and back barrier or encapsulation layers 794 and 790. In a representative embodiment, the substrate (not shown for clarity) of each photovoltaic array 510 is a sheet of metal such as aluminum or galvanized stainless steel; other plastic or glass materials may also be used. The substrate can be rigid or flexible. Photovoltaic arrays 510 can be attached to the substrate using an adhesive such as epoxy Alternatively, the photovoltaic arrays 510 can be formed or printed directly on the substrate such as by sputtering methods shown in U.S. patent application Ser. No. 10/973,714, titled Manufacturing Apparatus And Method For Large-Scale Production Of Thin-Film Solar Cells, filed Oct. 25, 2004 and U.S. patent application Ser. No. 11/451,616, titled Photovoltaic Module With Integrated Current Collection And Interconnection, filed Jun. 13, 2006 which are herein included by reference. The photovoltaic arrays 510 are connected to each other by electrical connections 793. A capacitor 615 and the DC/DC converter 670 can be integrated onto a separate substrate, such as a printed circuit board 792, which can then be electrically attached to the photovoltaic arrays 510. Alternatively, the printed circuit board 792 can be a flex circuit. Alternatively, the capacitor and the converter can be attached, formed or deposited directly onto the encapsulation layers 794 and 790. The photovoltaic arrays 510 are connected to the printed circuit board 792 by electrical connection(s) 793. The encapsulation layer 794 is formed over the photovoltaic arrays 510 and the printed circuit board 792. The front barrier or encapsulation layer 794 can be a polymer layer, a sheet of glass that is sealed to a sheet of polymer or plastic material such as PET or EVA that is bonded or laminated to the photovoltaic arrays 510 and the other components, such as DC/DC converter 670. The back barrier layer 790 is formed under the photovoltaic arrays 510 and the printed circuit board 792, as described with regard to layer 794.

The electrical components such as capacitor 615 and DC/DC converter 670 can be surface mounted to the printed circuit board 792 or incorporated into the printed circuit board 792. The electrical and other components can be encapsulated in epoxy and/or encapsulated by the encapsulation layer 794. The printed circuit board 792 can have varying degrees of integration. For example, components such as the capacitors and inductors can be discrete components that are attached to the printed circuit board 792. The main energy storage capacitor 615 can be a ceramic capacitor attached to the printed circuit board 792. Alternatively, the main energy storage capacitor 615 can also be formed into or onto the printed circuit board 792 itself. The various inductors that are part of the converter can be discrete components. Alternatively, the inductors can also be formed into or onto the printed circuit board 792 itself. For instance, in a multi-level printed circuit board, various trace patterns combined with vias, bond wires, or jump wires can be used to fashion inductors. Alternatively, the printed circuit board 792 can be made of flexible materials and consist of multiple and/or localized layers.

Referring to FIG. 7A, a side view of a first photovoltaic package of FIG. 6 in accordance with a representative embodiment is shown. In this embodiment, the front barrier layer 794 comprises an encapsulant and the rear barrier 790 comprises a molded plastic substrate which supports the cells 520 and the circuit board 792. Referring to FIG. 7B, a side view of a second photovoltaic package of FIG. 6 in accordance with a representative embodiment is shown. The illustrated photovoltaic package 607 comprises a back barrier 714, a device layer 791, and a front barrier 711. In a representative embodiment, the back barrier 714 is a sheet of metal such as aluminum or galvanized stainless steel; other plastic or glass materials may also be used. The back barrier 714 can be rigid or flexible. Photovoltaic arrays 510 can be attached to the back barrier 714 using an adhesive such as epoxy Alternatively, the photovoltaic arrays 510 can be formed or printed directly on the back barrier 714 as described above. The photovoltaic arrays 510 are connected to each other by electrical connections 793. A capacitor 615 and the DC/DC converter 670 can be integrated onto a separate substrate, such as a printed circuit board 792, which can then attached to the back barrier 714. Alternatively, the printed circuit board 792 can be a flex circuit. Alternatively, the capacitor and the converter can be attached, formed or deposited directly onto the back barrier 714. The photovoltaic arrays 510 are connected to the printed circuit board 792 by electrical connections 793. The front barrier 711 is located over the photovoltaic arrays 510, and the printed circuit board 792. The front barrier 711 can be a sheet of glass. The front barrier 711 is sealed to the back barrier 714 by an edge seal 712. The space between the front barrier 711, the back barrier 714, and the edge seal 712 is filled with an encapsulant 713. Alternatively, the space can be filled with air or a gas such as argon.

Referring to FIG. 7C, a side view of a third photovoltaic package of FIG. 6 in accordance with a representative embodiment is shown. The illustrated photovoltaic package 607 comprises single glass laminate. The photovoltaic package 607 comprises a back barrier 714, a device layer 791, and a front barrier 711. In a representative embodiment, the front barrier 711 can be a sheet of glass. Photovoltaic arrays 510 can be attached to the front barrier 711 using an adhesive such as epoxy Alternatively, the photovoltaic arrays 510 can be formed or printed directly on the front barrier 711 as described above. The photovoltaic arrays 510 are connected to each other by electrical connections 793. A capacitor 615 and the DC/DC converter 670 can be integrated onto a separate substrate, such as a printed circuit board 792, which can then attached to the front or back barrier. Alternatively, the printed circuit board 792 can be a flex circuit. Alternatively, the capacitor and the converter can be attached, formed or deposited directly onto the front barrier 711. The photovoltaic arrays 510 are connected to the printed circuit board 792 by electrical connections 793. The back barrier 714 is sealed against the edges of the front barrier 711. The back barrier 714 is a sheet of plastic, or plastic and metal such as aluminum. The back barrier 714 can be rigid or flexible. The space between the front barrier 711, the back barrier 714, and the edge seal 712 is filled with an encapsulant 713. Alternatively, the space can be filled with air or a gas such as argon.

Referring to FIG. 7D, a side view of a fourth photovoltaic package of FIG. 6 in accordance with a representative embodiment is shown. The illustrated photovoltaic package 607 comprises a flexible laminate. The photovoltaic package 607 comprises a back barrier 714, a device layer 791, and a front barrier 711. In a representative embodiment, the front barrier 711 and the back barrier 714 can be a sheet or layers of plastic, such as EVA and/or PET. The back barrier 714 can also include a metal such as a metal foil. The photovoltaic arrays 510, capacitor 615, the DC/DC converter 670, the printed circuit board 792, and the electrical connections 793 are floating and sealed between the front barrier 711 and the back barrier 714 with an encapsulant 713.

Referring again to FIG. 6, the photovoltaic array 510 can include many series-connected thin-film photovoltaic cells. Thin film photovoltaic power cells can be constructed by deposition of thin layers of materials such as amorphous silicon (a-Si), copper-indium-gallium diselenide (CIGS), etc. Each photovoltaic cell produces a low DC voltage, typically a fraction of one volt. A manufacturing technology capable of inexpensively connecting many of these cells in series is employed, such as that described in U.S. patent application Ser. No. 11/451,616, titled Photovoltaic Module With Integrated Current Collection And Interconnection, filed Jun. 13, 2006, so that the photovoltaic array 510 produces a relatively high voltage DC output at its peak power operating point with rated solar irradiation. For example, when the utility voltage is 120 Vrms, the PV output voltage for a single photovoltaic element module can be in the vicinity of several tens of volts. The PV output voltage of an photovoltaic array 510 may typically be in the vicinity of 20 VDC. The photovoltaic array 510 can include diodes ("backplane or bypass diodes") that protect the photovoltaic array 510 in the event that the photovoltaic array 510 is partially shadowed, shaded, or has irregular illumination as described in U.S. patent application Ser. No. 11/812,515, titled Photovoltaic Module Utilizing An Integrated Flex Circuit And Incorporating A Bypass Diode, filed Jun. 19, 2007 which is herein included by reference. Backplane diodes affect the voltage produced by the photovoltaic array under partially shaded conditions. Each diode is connected in an anti-parallel manner across one or more photovoltaic cells; the short-circuit current produced by the photovoltaic array depends on a variety of factors including the solar irradiation.

The energy storage element, such as a capacitor 615 comprises an energy storage element connected across the terminals of the photovoltaic array 510 (i.e. the capacitor 615 is in series with the photovoltaic array 510). The capacitor 615 keeps the instantaneous power flowing out of the photovoltaic array 510 approximately constant and equal to the maximum power that the photovoltaic array 510 is capable of producing. Hence, the capacitor 615 maximizes energy capture.

Conventional PV systems employ electrolytic capacitors for this purpose; however, electrolytic capacitors do not exhibit the very low profile required for integration into a low-profile module, nor do they meet the requirements of long life and high temperature operation. In a representative embodiment, the capacitor 615 can be a ceramic chip capacitor. Ceramic chip capacitors exhibit low profiles of less than 11 mm and are capable of high temperature operation. Ceramic capacitors can be used in the photovoltaic power module 100 because the power levels are so low in the photovoltaic power module 100 that the capacitance required is small. Hence, the total capacitance desired at the applicable voltage rating is available in a ceramic capacitor.

The DC/DC converter 670 includes a transformerless DC/DC converter. The term transformerless means that the DC/DC converter power does not flow through a transformer. However, the device may contain a transformer for functions other than power processing, such as to couple a MOSFET gate drive signal between the controller circuit and the MOSFET gate or using a small transformer as current-sensing device to transmit a signal proportional to the transistor or diode current to the controller, etc. The DC/DC converter 670 is a low-profile and high-efficiency converter which enables its integration into a thin film module package. The DC/DC converter 670 can be capable of producing an output voltage that is less than or greater than the input voltage. Hence, the DC/DC converter 670 can be a buck converter with a pass-through path, a boost converter with a pass-through path, a buck converter followed by a boost converter (preferably with a pass-through path), or a buck-boost converter (preferably with a pass-through path). In a representative embodiment, the buck converter with a pass-through path, the boost converter with a pass-through path, the buck converter followed by the boost converter (preferably with a pass-through path), or the buck-boost converter (preferably with a pass-through path) are transformerless. In the embodiment of FIG. 6, the DC/DC converter 670 includes a buck converter 550 followed by a boost converter 560 or it can be a buck-boost converter. In a representative embodiment, the buck converter followed by the boost converter, or the buck-boost converter are transformerless. Alternatively, any other device that can produce an output voltage that is less than or greater than the input voltage can be used.

The DC/DC converter 670 can be synchronous or asynchronous. An asynchronous buck converter, for example, can include a transistor, a diode, and an inductor. In asynchronous operation, the transistor switches with a particular duty cycle that results in a lower voltage at the output. A synchronous buck converter, for example, can include two transistors and an inductor (i.e., the diode of the asynchronous converter is replaced by a transistor, such as a MOSFET). In synchronous operation, the two transistors switch alternately with a particular duty cycle that results in a lower voltage at the output, and the controller is modified turn on the additional transistor when the first transistor is off, and optionally also to turn off the additional transistor when the inductor current passes through zero. Likewise, a synchronous or asynchronous boost converter, buck converter followed by a boost converter, or buck-boost converter can be used as part of DC/DC converter 670. Alternatively, in synchronous implementations, a diode can be employed to allow current flow during short delays (dead times).

The DC/DC converter 670 optionally also includes a pass-through path. The pass-through path directly connects the photovoltaic arrays 510 to the output of the DC/DC converter 670. The pass-through path can be directly integrated into the DC/DC converter 670 or parts of the DC/DC converter 670 such as the buck converter 550 and the boost converter 560. In a representative embodiment, the transistors of the buck converter 550 and the boost converter 560 can stop switching and form a pass-through path from the photovoltaic arrays 510 to the output of the DC/DC converter 670. Alternatively, a separate pass-through path or paths can exclude the DC/DC converter 670.

The DC/DC converter 670 can operate in at least three modes: buck mode, boost mode, and pass through mode. In buck mode, the transistors of the buck converter 550 switch and the transistors of the boost converter 560 do not switch thereby reducing the voltage at the output of the DC/DC converter 670. In boost mode, the transistors of the boost converter 560 switch and the transistors of the buck converter 550 do not switch thereby increasing the voltage at the output of the DC/DC converter 670. In pass through mode, the transistors of the buck converter 550 and the boost converter 560 do not switch, and a pass-through path directly connects the photovoltaic arrays 510 to the output of the DC/DC converter 670; preferably so that the DC/DC converter 670 passes the power of the photovoltaic arrays 510 without changing the current or voltage. The controller 680 decides which mode will cause the module to produce the most power by testing each of the modes periodically. For example, the controller 680 determines the power produced in each of the buck mode, boost mode, and pass through mode. The controller 680 then operates the module in the mode that produced the most power. The controller 680 perturbs the module periodically to determine if a new mode should be selected.

To achieve a low profile of several millimeters or less, the DC/DC converter must operate with a high switching frequency, typically several hundred kilohertz or more. However, a high switching frequency typically leads to high switching loss, and hence low efficiency as noted above with regard to the "shuffle" converter approach. However, the shuffle approach requires bidirectional converters and more complex interconnections. Instead, the DC/DC converter 670 ceases switching under balanced conditions (when all photovoltaic arrays have the same maximum power point), leading to very high efficiency under nominal operating conditions. Switching, with the associated loss, occurs only when substantial system imbalances exist. The DC/DC converter 670 is connected directly in series with the photovoltaic array 510. This high efficiency and simple interconnection allows the converter to be integrated directly into a photovoltaic package 607 with a low profile.

In addition, to achieve a low profile of several millimeters or less, while also meeting current waveform requirements such as IEEE Standard 1547, the DC/DC converter 670 operates with a high switching frequency, typically 100 kHz or more. However, a high switching frequency typically leads to high switching loss, and hence low efficiency. The DC/DC converter 670 can optionally employ the discontinuous conduction mode or the boundary conduction mode to avoid these switching losses and achieve high efficiency operation. In discontinuous conduction mode, the inductor current of an inductor of the DC/DC converter goes to zero for at least a period of time before the DC/DC converter cycles or switches. In boundary conduction mode, the inductor current of an inductor of the DC/DC converter goes to zero for an instant before the DC/DC converter cycles or switches. The buck portion and boost portion of the DC/DC converter can be operating simultaneously and in different modes.

The optional EMI filter (not shown) separates the high-frequency switching elements of the DC/DC converter 670 and the inverter. Meeting regulatory limits on conducted EMI, such as those imposed by FCC Part 15 Subpart B, requires that a filter be placed between the high-frequency switching elements and an AC utility. Conventional inverters employ AC EMI filters for this purpose, which typically include high-profile AC-rated capacitors. The EMI filter employs a DC EMI filter that uses low-profile DC-rated capacitors. This is achieved by positioning the EMI filter on the DC side of the inverter 120 which is located outside of the photovoltaic element module 505, as shown in FIG. 5, and by avoiding high-frequency switching of inverter elements. The DC side of the inverter is the power input of the inverter. The AC side of the inverter is the power output of the inverter. The optional EMI filter can be integrated in each photovoltaic element module 505 or located at the inverter 120. If the EMI filter is integrated into the module, then it can be placed at the output of the boost converter, the input of the buck converter, or both.

The photovoltaic element module 505 is controlled by a controller 680. The controller 680 provides the duty cycle modulation and/or frequency modulation, required to drive the switching transistors of DC/DC converter 670 and maintain operation in the discontinuous or boundary conduction modes. Controller 680 performs the functions of maximum power tracking, pass-through perturbing, selecting appropriate transistor duty cycles to interface to the given string current, output voltage limiting, and shutdown modes. In a representative embodiment, some or all of the control functions are realized through the use of digital circuitry, enabling a greater degree of sophistication. The controller 680 can be a central, integrated controller or, alternatively, individual sections of the photovoltaic element module 505 can have dedicated controllers. For example, the buck converter 550 and boost converter 560 can have separate controllers. Likewise, the pass-through can be operated with a separate controller. Optionally, the controller 680 can use voltage, current or other information from the photovoltaic array 510, the energy storage device, such as a capacitor 615 or another storage device, a DC/DC converter 670, the buck converter 550, or the boost converter 560.

When a plurality of photovoltaic element modules 505 are combined together, the resulting system of "smart PV modules" is able to adapt to a changing environment, maximizing energy capture in the presence of complex shadows, shading, and reflections. With the addition of communications capability, it is further possible to obtain operational and performance data on a fine scale.

Figure 8:
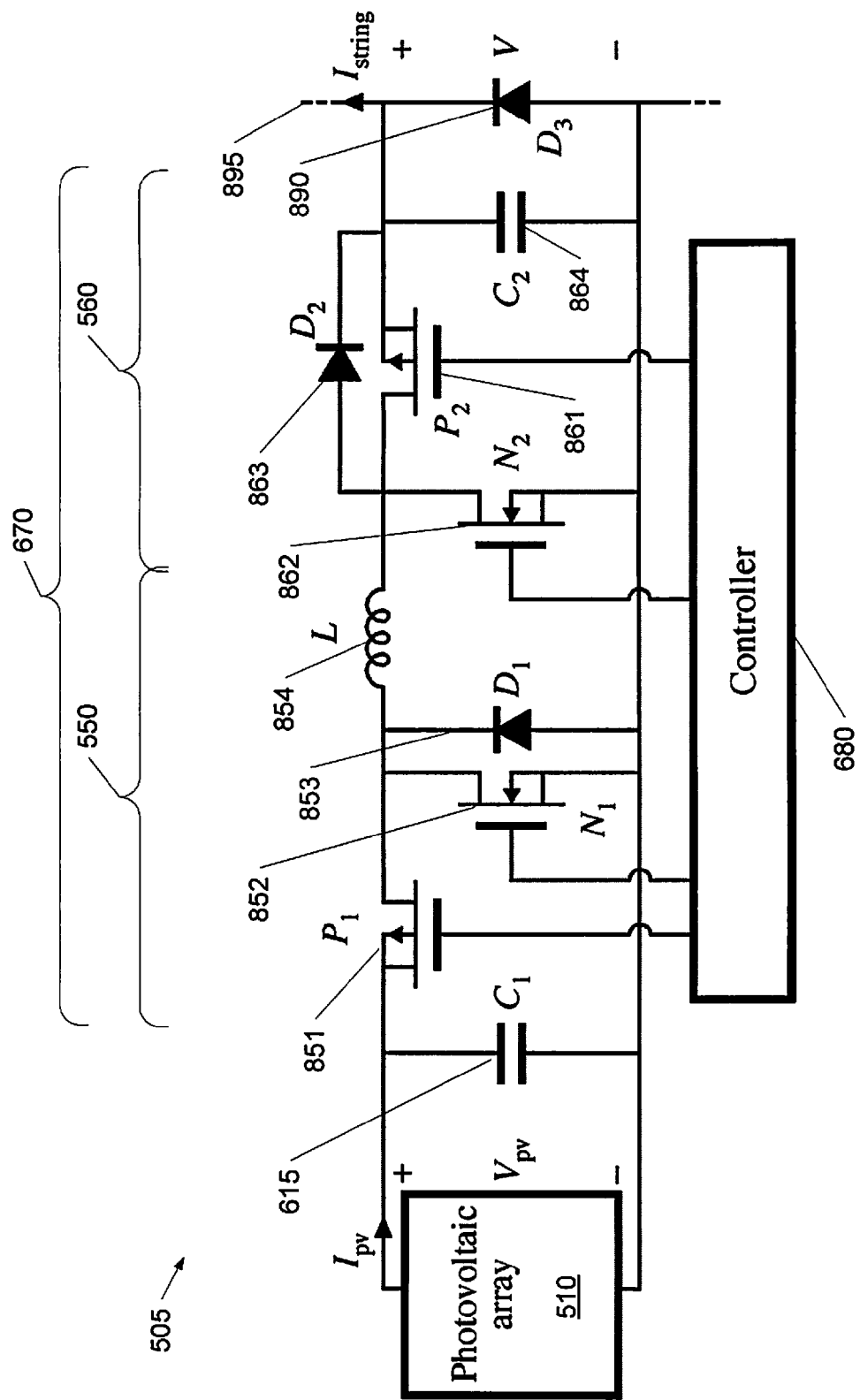
FIG. 8 is a circuit of the photovoltaic element module of FIG. 6 in accordance with a representative embodiment.

Referring to FIG. 8, a circuit of the photovoltaic element module 505 of FIG. 6 in accordance with a representative embodiment is shown. The photovoltaic element module 505 achieves high efficiency under nominal conditions by employing a converter architecture whose efficiency is maximized under nominal balanced conditions, switching and converting power only as necessary to mitigate imbalances between photovoltaic modules. In the photovoltaic element module 505, the DC/DC converter is realized by the cascade connection of buck and boost converters.

The photovoltaic element module 505 includes an photovoltaic array 510, an energy storage device, such as a capacitor 615 or another storage device, a DC/DC converter 670, and a controller 680. The DC/DC converter 670 can include a buck converter 550 and a boost converter 560. The buck converter 550 includes transistor 851 ($P_1$), transistor 852 ($N_1$), optional diode 853 ($D_1$), and inductor 854 (L). The boost converter 560 includes transistor 861 ($P_2$), transistor 862 ($N_2$), optional diode 863 ($D_2$), and capacitor 864 ($C_2$). The two converter functions can be controlled independently. Transistor 851 ($P_1$) and transistor 852 ($N_1$), together with inductor 854 (L), provide a buck converter function, and transistor 862 ($N_2$) and transistor 861 ($P_2$), with inductor 854 (L) provide a boost converter function.

A string bypass diode 890 ($D_3$) is included to improve fault tolerance. If for some reason a DC/DC converter fails to operate (for example, if it behaves as an open circuit), then diode $D_3$ allows a path for conduction of the string current $I_{string}$, so that the remaining elements of the series string are able to deliver their power to the inverter.

Component values for a discrete circuit realization of the DC/DC converter stage, having a full power photovoltaic array input of 20 V at 1 A, a maximum string current of $I_{string}$=1 A, and a maximum output voltage of V=20 V, are, for example, as follows. Transistor $N_1$: n-channel power MOSFET rated 30 V, such as that available from ON Semiconductor as part number NTGS4141N. Transistor $P_1$: 30 V p-channel MOSFET, such as that available from ON Semiconductor as part number NTGS4111P. Transistor $N_2$: 60 V n-channel MOSFET, such as that available from ON Semiconductor as part number NTF3055-100. Transistor $P_2$: 60 V p-channel MOSFET, such as that available from ON Semiconductor as part number NTF2955. Filter inductor L: 100 pH at 1.5 A, low profile. Capacitor $C_1$: two 25 V, 4.7 µf X7R multilayer ceramic capacitors connected in parallel, each such as that available from Murata as part number GRM31CR71E475KA88L. Capacitor $C_2$: two 50 V 2.2 µF X7R capacitors connected in parallel, each such as that available from Murata as part number GRM31CR71H225KA88L. Diode $D_1$: 30 V Schottky diode, such as that available from ON Semiconductor as part number MBRO530T3G. Diode $D_2$: 60 V Schottky diode, such as that available from ON Semiconductor as part number SS16. Diode $D_3$: 60 V Schottky diode, such as that available from ON Semiconductor as part number SS26.

Under nominal balanced conditions, in a nominal range, the maximum power points of every photovoltaic element module 505 occur at the same current. A string current 895 can therefore be chosen to be equal to this optimal current, and the DC/DC converters can directly connect their photovoltaic arrays to the series string. The controller 680, or optionally a pass-through controller, tests for nominal balanced conditions by momentarily operating the photovoltaic element module 505 in each of a pass-through mode, a buck mode, and a boost mode. The controller 680 chooses the mode that produces the most power. Hence, the nominal range can be defined as the conditions where the pass-through mode produces more power than the buck mode or the boost mode. Alternatively, the nominal range is plus or minus ten percent of the optimal string current required to maintain a constant voltage at the input of the inverter. Here, the controller 680 chooses the pass-through mode. When the pass-through mode produces the most power, the controller 680, or optionally a pass-through controller, asserts a pass-through mode by leaving transistor 851 ($P_1$) and transistor 861 ($P_2$) in the ON state, and transistor 852 ($N_1$) and transistor 862 ($N_2$) in the OFF state, without high frequency switching. Hence, in pass-through mode, the photovoltaic array is connected through transistor 851 ($P_1$), transistor 861 ($P_2$), and inductor 854 (L) to the series string, and current $I_{string}$ (string current 895) flows through the photovoltaic array 510. The transistor 851 ($P_1$) and transistor 861 ($P_2$) in the ON state, and transistor 852 ($N_1$) and transistor 862 ($N_2$) in the OFF state comprise a pass-through. The pass-through comprises a low resistance path from the photovoltaic array 510 to the output of the DC/DC converter 670. As described above, the pass-through can be integrated into the buck converter 550 and/or the boost converter 560. Alternatively, a separate pass-through path or paths can exclude the buck converter 550 and/or the boost converter 560.

In the event that one of the photovoltaic array 510 is partially shaded, then the current at its maximum power point is reduced. To interface this reduced photovoltaic array current to the larger string current $I_{string}$, (string current 895) the DC/DC converter 670 must increase the current. The controller 680, or optionally a pass-through controller, tests for nominal balanced conditions by momentarily operating the photovoltaic element module 505 in each of a pass-through mode, a buck mode, and a boost mode. Here, the controller 680 chooses the buck mode. The controller 680 accomplishes this through high frequency switching of transistor 851 ($P_1$) and transistor 852 ($N_1$). Transistor 851 ($P_1$) is turned ON by the controller 680 for a duration $t_1$, with transistor 852 ($N_1$) in the OFF state. At the end of this interval, the controller turns transistor 851 ($P_1$) OFF and turns transistor 852 ($N_1$) ON, for a second interval of duration $t_2$. At the conclusion of the second interval, the process repeats. The switching period $T_s$ is defined as $T_s = t_1 + t_2$. The duty cycle $D_1$ of transistor 851 ($P_1$) is defined as $D_1 = t_1/T_s$. In this mode of operation (called here the "buck mode"), transistor 861 ($P_2$) and transistor 862 ($N_2$) are preferably not switched at high frequency, with transistor 862 ($N_2$) remaining in the OFF state and transistor 861 ($P_2$) remaining in the ON state. The ratio of the photovoltaic current $I_{pv}$ of the photovoltaic array 510 to the string current $I_{string}$ (string current 895) is then given approximately by $I_{pv}/I_{string} = D_1$. Since the duty cycle must lie in the range $0 \leq D_1 \leq 1$, the controller 680 is able to choose a duty cycle $D_1$ to cause the photovoltaic array 510 to produce its maximum power when the maximum power point occurs at an array current $I_{pv}$ that that is less than the string current $I_{string}$. The controller 680 includes a maximum power tracking algorithm that, either directly or indirectly, causes transistor 851 ($P_1$) to operate substantially at this duty cycle. In the buck mode, the high frequency switching of transistor 851 ($P_1$) and transistor 852 ($N_1$) leads to additional power loss not present under nominal balanced conditions. Also in the buck mode, the DC/DC converter 670 reduces the voltage: the converter output voltage V is given approximately by the duty cycle multiplied by the voltage of the photovoltaic array $V = D_1 V_{pv}$. Hence the effect of partial shading of a photovoltaic module is to reduce the output voltage of its corresponding DC/DC converter V, and hence also to reduce the total string voltage $V_{string}$.

To maximize the efficiency of the inverter (element 120 in FIG. 5) and reduce its cost, it is advantageous to minimize variations in the total string voltage $V_{string}$. Hence, when shading of one photovoltaic array causes its DC/DC converter to reduce its output voltage V, the remaining converters of the photovoltaic element modules of the string must increase their output voltages to maintain a constant total string voltage $V_{string}$. This is accomplished through high frequency switching of transistors $P_2$ and $N_2$ in the other converters.

With respect to the remaining converters of the photovoltaic element modules, the respective controllers test for nominal balanced conditions by momentarily operating the remaining photovoltaic element modules in each of a pass-through mode, a buck mode, and a boost mode. Here, the controllers choose the boost mode. In the remaining photovoltaic element modules, the controller 680 turns transistor 862 ($N_2$) ON for an interval of length $t_1$, with transistor 861 ($P_2$) in the OFF state. At the end of this interval, the controller 680 turns OFF transistor 862 ($N_2$), and turns ON transistor 861 ($P_2$). Transistor 861 ($P_2$) then conducts for a second interval of length $t_2$. At the end of this second interval, the process repeats. The switching period is defined as $T_s = t_1 + t_2$, and the duty cycle in this mode (called here the "boost mode") is defined as $D_2 = t_1/T_s$. In the boost mode, the controller leaves transistor 851 ($P_1$) always in the ON state, and transistor 852 ($N_1$) always in the OFF state. The current ratio is now given approximately by $I_{pv}/I_{string} = 1/(1-D_2)$, and the voltage ratio is given approximately by $V/V_{pv} = 1/(1-D_2)$. Since $0 \leq D_2 \leq 1$, the DC/DC converter now increases the voltage, and the string current $I_{string}$ is less than the photovoltaic array current $I_{pv}$. Since transistor 862 ($N_2$) and transistor 861 ($P_2$) switch at high frequency in the boost mode, additional losses are incurred relative to operation under nominal balanced conditions.

The DC/DC converter 670 optionally includes diode 853 ($D_1$) and diode 863 ($D_2$) to assist during the high-frequency switching transitions. Short delays or "dead times" are introduced into the high-frequency switching transitions because, in order to achieve high efficiency, transistor 851 ($P_1$) and transistor 852 ($N_1$), or transistor 862 ($N_2$) and transistor 861 ($P_2$), must not simultaneously conduct. To ensure this, the controller 680, between the turning off of one transistor and the turning on of the next transistor, typically introduces short delays. During this dead time diode 853 ($D_1$) or diode 863 ($D_2$) provide a path for conduction of the inductor current.

As noted previously, it is desirable that the total string voltage $V_{string}$ of the photovoltaic element modules be maintained at a substantially constant value, and that when some of the photovoltaic arrays experience shading, the DC/DC converters of the remaining photovoltaic arrays increase their output voltages. This functionality could be attained either through a central controller that communicates the desired control actions to each DC/DC converter module, or by the actions of local autonomous controllers within the DC/DC converter modules themselves. A preferred embodiment is described here, that implements the second approach. It is further desired that the maximum power point algorithms of the individual photovoltaic element modules be non-interacting, so that a change in one photovoltaic element module of the series string does not disrupt the operating points of the other photovoltaic element modules in the string.

Figure 9:
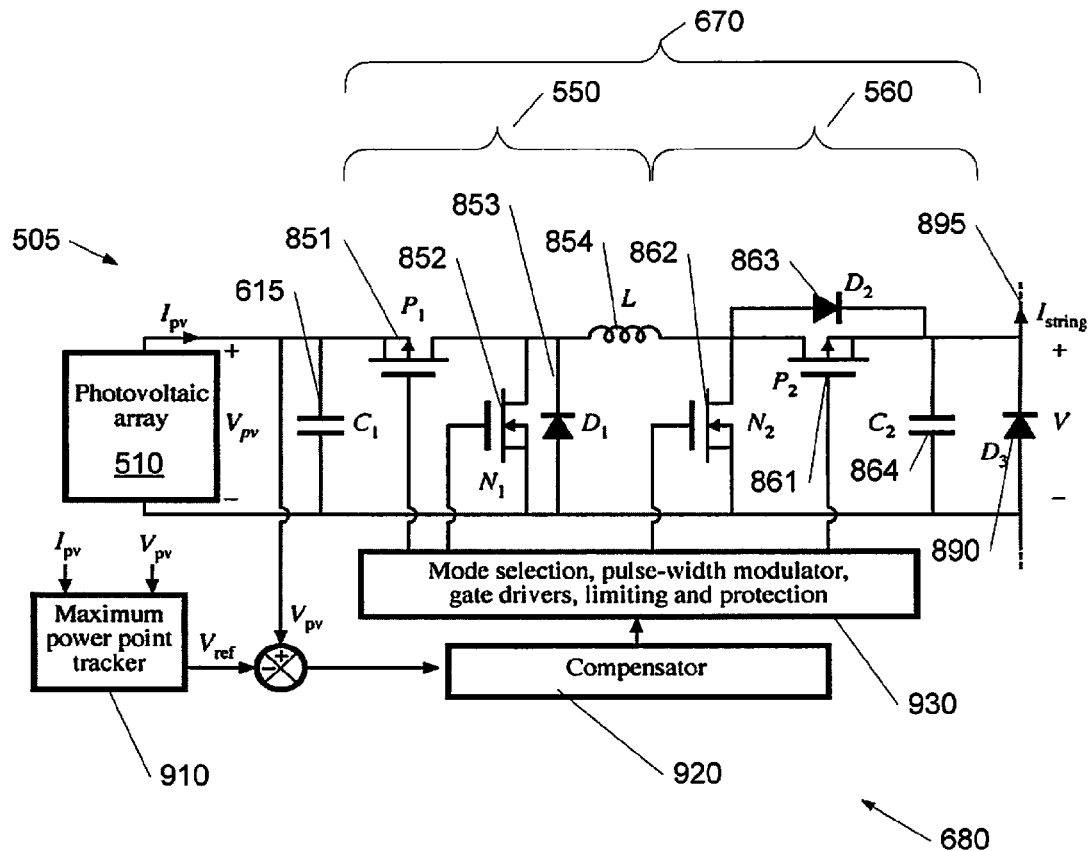
FIG. 9 is a circuit of a controller of the photovoltaic element module of FIG. 8 in accordance with a representative embodiment.

Referring to FIG. 9, a circuit of a controller of the photovoltaic element module of FIG. 8 in accordance with a representative embodiment is shown. The photovoltaic element module 505 includes an photovoltaic array 510, an energy storage device, such as a capacitor 615 or another storage device, a DC/DC converter 670, and a controller 680. The DC/DC converter 670 can include a buck converter 550 and a boost converter 560. The buck converter 550 includes transistor 851 ($P_1$), transistor 852 ($N_1$), optional diode 853 ($D_1$), and inductor 854 (L). The boost converter 560 includes transistor 861 ($P_2$), transistor 862 ($N_2$), optional diode 863 ($D_2$), and capacitor 864 ($C_2$). The two converter functions can be controlled independently. A string bypass diode 890 ($D_3$) is included to improve fault tolerance.

The controller 680 includes a maximum power point tracker 910, a compensator 920, and a driver module 930. The driver module 930 includes a mode selector, a pass-through controller, a pulse-width modulator, gate drivers, and a limiting and protection module. The pass-through controller can sense when the string current is in the nominal range (for example, by testing the module in buck mode, boost mode, and pass-through mode) and place the photovoltaic element module into pass-through mode.

The controller 680 contains an inner feedback loop that adjusts the transistor duty cycles such that the photovoltaic array voltage $V_{pv}$ substantially follows a reference signal $V_{ref}$ regardless of variations in the string voltage or string current. A maximum power point tracking algorithm, implemented by the maximum power point tracker 910, adjusts the value of $V_{ref}$ such that the power produced by the photovoltaic array $P_{pv}=V_{pv}I_{pv}$ is maximized. The maximum power point tracking algorithms can be, for example, a "perturb and observe" (P&O) algorithm. Because of the inner feedback loop, the maximum power point tracker 910 need not adjust its output $V_{ref}$ in response to variations in the string current $I_{string}$ or the converter output voltage V. Consequently, the maximum power point trackers of the various photovoltaic element modules of the series string are decoupled, eliminating system transient and stability problems caused by interactions between multiple maximum power point tracking algorithms.

The controller 680 provides sufficient local autonomous control so that the photovoltaic element modules can operate efficiently without communication of control information between module blocks or between module blocks and a central controller. Hence, a system of photovoltaic element modules can be regulated by merely adjusting the input current (i.e., $I_{string}$) of the inverter (element 120 in FIG. 5) such that the desired voltage $V_{string}$ is applied to the inverter input terminals. The reason for this is that the control 680 causes the converter output terminals to exhibit a constant power source characteristic.

Figure 10:
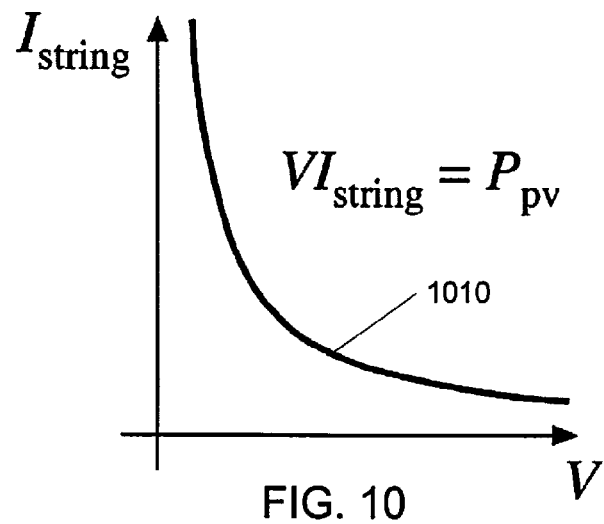
FIG. 10 is a graph of a constant power source characteristic of an autonomous photovoltaic element module in accordance with a representative embodiment.

Referring to FIG. 10, a graph of a constant power source characteristic of an autonomous photovoltaic element module in accordance with a representative embodiment is shown. The power $P_{pv}$ flowing into the converter input terminals is independent of the output terminal quantities V and $I_{string}$. Since the converter has a high efficiency, its equilibrium output power is also approximately equal to $P_{pv}$. Therefore, the converter output terminals exhibit the equilibrium constant power output characteristic $VI_{string}=P_{pv}$ as illustrated by the current-voltage plot of a constant power source characteristic profile 1010. Since all of the photovoltaic element modules of FIG. 5 have their outputs connected in series and share the same current $I_{string}$, the module output voltages depend directly on their respective photovoltaic array powers. The total string voltage $V_{string}$ is equal to the sum of the module output powers divided by the string current $I_{string}$. Hence the inverter can adjust its DC input voltage $V_{string}$ through control of the current $I_{string}$ that it draws at its input port. The constant power characteristic requires that the output quantities be limited under open-circuit and short-circuit conditions; converter output voltage limiting and possibly also output current limiting modes are therefore required.

Figure 11:
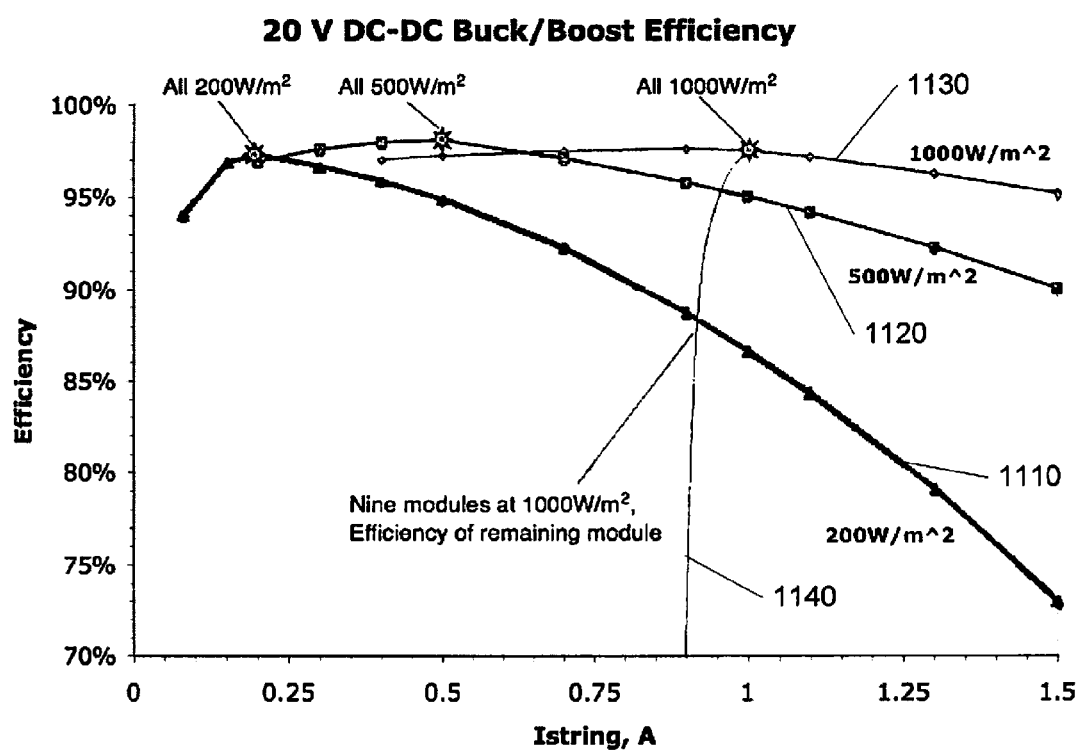
FIG. 11 is a graph of a predicted efficiency of DC/DC converter power stages under various operating conditions in accordance with a representative embodiment.

FIG. 11 is a graph of predicted efficiency of DC/DC converter power stages under various operating conditions in accordance with a representative embodiment. A system of ten 20 W photovoltaic element modules connected in series string is analyzed. Under nominal balanced operating conditions (where each module produces the same power, equal to the rated power), each photovoltaic element module produces 20 V at 1 A, for a total string output of 200 V at 1 A. Profile 1130 shows the string current (A) versus the efficiency where all photovoltaic element modules receive 1000 W/m². Profile 1120 shows the string current (A) versus the efficiency where all photovoltaic element modules receive 500 W/m². Profile 1110 shows the string current (A) versus the efficiency where all photovoltaic element modules receive 200 W/m². Profile 1140 shows the string current (A) versus the efficiency of a 0 W/m² module where the remaining nine photovoltaic element modules receive 1000 W/m². It can be seen that the predicted efficiencies under balanced conditions (where each module produces the same power) are very high, not only at full power (solar irradiance of 1000 W/m²), but also at half power (500 W/m²) and at 20% power (200 W/m²). The analysis assumes that the central inverter adjusts the string current as necessary to maintain a total string voltage of $V_{string}$=200V. Unbalanced conditions lead to degradation of the efficiency of the lower power modules. Profile 1140 illustrates the effect of partial shading of one module, while the other nine modules operate with full solar irradiance. Profile 1140 is the locus of the efficiency of the partially shaded module. At a solar irradiance of 200 W/m², the efficiency of the converter serving the partially shaded photovoltaic array has decreased by approximately 10%, because of the resulting large voltage step-down ratio.

Figure 12:
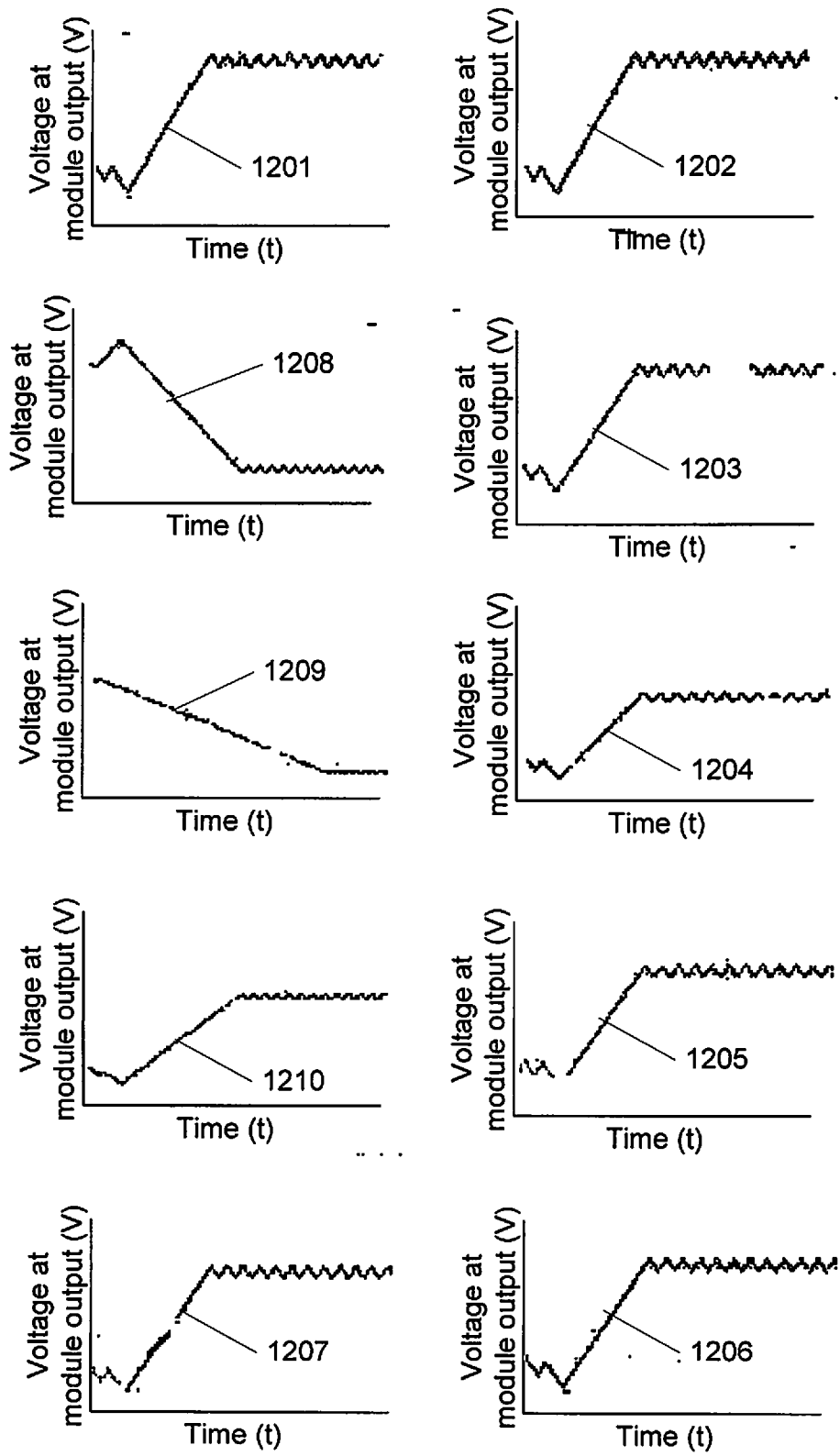
FIG. 12 is a graph of a simulation of turn-on transients of a ten photovoltaic element module system in accordance with a representative embodiment.

Referring to FIG. 12, a graph of a simulation of a turn-on transient of a ten photovoltaic element module system in accordance with a representative embodiment is shown. The turn-on transients of a ten photovoltaic element module system were simulated using MATLAB/Simulink. The ten photovoltaic element module system is a 200 W photovoltaic element module string. The ten photovoltaic element modules in series drive the input port of an inverter. Seven of the photovoltaic element modules operate with a nominal solar irradiance of 1000 W/m². Two of the photovoltaic element modules operate under partially shaded conditions, with solar irradiances of 400 W/m² and 200 W/m². The remaining photovoltaic element module operates with a solar irradiance of 1200 W/m². The responses of the non-interacting perturb-and-observe maximum power point tracking algorithms are illustrated by response of photovoltaic element modules 1-10 (1201-1210). The response of photovoltaic element modules 1-10 (1201-1210) shows the respective module output voltage (V) versus time (t) for about 1 second. Responses 1201-1207 represent the 1000 W/m² cells. Response 1208 represents the 200 W/m² cell. Response 1209 represents the 400 W/m² cell. Response 1210 represents the 1200 W/m² cell. These waveforms are plots of the voltages $V_{ref}$ commanded by the maximum power point trackers of each module versus time. The photovoltaic array maximum power points occur at voltages in the vicinity of 20 V. The perturb-and-observe algorithms are well behaved, and reach their equilibrium operating points after several tenths of a second. Typical P&O step sizes are 10 mV, and step times are in the vicinity of 2-5 msec. The module output voltages are distributed in proportion to the output powers.

The foregoing description of the exemplary embodiments have been presented for purposes of illustration and of description. It is not intended to be exhaustive or to limit the invention to the precise form disclosed, and modifications and variations are possible in light of the above teachings or may be acquired from practice of the invention. For example, the described exemplary embodiments focused on an representative implementation of a buck-boost converter for implementation on a 120V AC utility grid. The present invention, however, is not limited to a representative implementation as described and depicted. Those skilled in the art will recognize that the device and methods of the present invention may be practiced using various combinations of components. Additionally, the device and method may be adapted for different utility grid standards. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents. U.S. patent application Ser. No. 12/379,196, titled Thin-Film Photovoltaic Power System With Integrated Low-Profile High-Efficiency Inverter, filed on Feb. 13, 2009 is herein incorporated by reference in its entirety.

What is claimed is:

1. A photovoltaic device, comprising:
   at least one photovoltaic cell;
   a DC/DC converter electrically coupled to the at least one photovoltaic cell, wherein the at least one photovoltaic cell and the DC/DC converter are integrated into a photovoltaic package, wherein the DC/DC converter comprises a transformerless buck converter and a transformerless boost converter or a transformerless buck-boost converter; and
   a pass-through comprising a low resistance path from the at least one photovoltaic cell to an output of the DC/DC converter.

2. The device of claim 1, wherein the pass-through comprises a first pass-through integrated into the transformerless buck converter and a second pass-through integrated into the transformerless boost converter.

3. The device of claim 2, further comprising a ceramic capacitor electrically coupled to the DC/DC converter and to a string of the thin-film photovoltaic cells which include the at least one photovoltaic cell.

4. The device of claim 2, further comprising a pass-through controller electrically coupled to the transformerless buck converter and the transformerless boost converter, wherein the pass-through controller comprises a maximum power point tracker electrically coupled to the at least one photovoltaic cell.

5. The device of claim 2, wherein the DC/DC converter comprises at least four transistors.

6. The device of claim 1, wherein the DC/DC converter comprises at least two transistors and at least two diodes.

7. The device of claim 5, wherein the DC/DC converter further comprises an inductor integrated onto a printed circuit board or at least one layer of the package.

8. A method of operating a photovoltaic module, comprising:
   providing a photovoltaic cell power output to a DC/DC converter having at least two transistors;
   switching the at least two transistors only when a string current is not in a nominal range, wherein the string current passes through at least a portion of the photovoltaic module, and wherein the switching of the at least two transistors are controlled to provide a voltage; and
   providing the voltage to a string connection of the DC/DC converter, and wherein the nominal range is determined by perturbing the DC/DC converter in a buck mode, a pass-through mode, and a boost mode, and determining which mode produces the most power.

9. The method of claim 8, wherein the DC/DC converter comprises a buck converter, wherein switching the at least two transistors only when the string current is not in the nominal range comprises the buck mode comprising operating the buck converter while the photovoltaic cell is at least partially shaded.

10. The method of claim 9, wherein the buck converter comprises a first transistor and a second transistor, wherein operating the buck converter while the photovoltaic cell is at least partially shaded comprises switching the first transistor and the second transistor alternately.

11. The method of claim 10, wherein the DC/DC converter comprises a boost converter, wherein switching the at least two transistors only when the string current is not in the nominal range comprises the boost mode comprising operating the boost converter while a different photovoltaic cell is at least partially shaded.

12. The method of claim 11, wherein the boost converter comprises a third transistor and a fourth transistor, wherein operating the boost converter while the different photovoltaic cell is at least partially shaded comprises switching the third transistor and the fourth transistor alternately.

13. The method of claim 12, wherein when the string current is in the nominal range comprises a pass-through mode comprising maintaining the first and third transistors in a conductive state and maintaining the second and fourth transistors in a non-conductive state.

14. The method of claim 13, wherein the nominal range comprises a current within plus or minus ten percent of an inverter input current associated with maintaining a desired constant inverter input voltage.

15. The method of claim 13, wherein the photovoltaic cell and the DC/DC converter are integrated into a photovoltaic package.

16. A photovoltaic converter circuit, comprising:
   at least one photovoltaic cell; and
   a DC/DC converter, being connected to the at least one photovoltaic cell, the DC/DC converter comprising:
   a buck converter within the DC/DC converter and comprising at least one first transistor;
   a boost converter within the DC/DC converter and comprising at least one second transistor, and a pass-through path, wherein the buck converter is electrically coupled to the boost converter, wherein the first transistor is connected to the at least one second transistor and receives current from the at least one photovoltaic cell, wherein the switching of the at least first and second transistors is controlled to provide a voltage.

17. The circuit of claim 16, further comprising a ceramic capacitor electrically coupled to a string of the thin-film photovoltaic cells which include the at least one photovoltaic cell and to the DC/DC converter.

18. The circuit of claim 17, wherein the buck converter, the boost converter, the capacitor, and the at least one photovoltaic cell are integrated into a photovoltaic package.

19. The circuit of claim 18, wherein the buck converter further comprises a third pass-through transistor, and wherein the boost converter further comprises a fourth pass-through transistor.

20. The circuit of claim 19, further comprising a controller electrically coupled to the buck converter and the boost converter.

21. The circuit of claim 20, wherein the buck converter further comprises a first switching assist diode, and wherein the boost converter further comprises a second first switching assist diode.

22. The circuit of claim 21, wherein the controller comprises a boost controller, a buck controller, a pass-through controller, and a maximum power point tracker.

23. The circuit of claim 17, further comprising a plurality of photovoltaic laminate modules electrically connected in series with an inverter.

24. The circuit of claim 17, wherein the buck converter further comprises a buck diode, and the boost converter further comprises a boost diode.

25. A photovoltaic system, comprising:
an inverter electrically connected to at least two photovoltaic modules, each comprising:
at least one photovoltaic cell; and
a DC/DC converter electrically coupled to the at least one photovoltaic cell, and connected to the inverter, wherein the DC/DC converter comprises a pass-through path providing substantially no change to current or voltage, and wherein the DC/DC converters of the at least two photovoltaic modules are electrically connected in series with the inverter.

26. The system of claim 25, wherein each of the at least two photovoltaic modules comprise the at least one photovoltaic cell and the DC/DC converter integrated into a photovoltaic package.

27. The system of claim 26, wherein each of the DC/DC converters of the at least two photovoltaic modules each comprise a transformerless buck-boost converter.

28. The system of claim 27, wherein each of the at least two photovoltaic modules further comprises a controller comprising a maximum power point tracker electrically connected to its respective at least one photovoltaic cell.

29. A method of operating a photovoltaic system, comprising:
providing a plurality of photovoltaic modules having a power output in series;
operating at least one of the plurality of photovoltaic modules in a pass-through mode providing substantially no change to current or voltage;
operating at least one of the plurality of photovoltaic modules in a boost mode by controlling switching of at least one transistor, wherein the voltage is increased;
operating at least one of the plurality of photovoltaic modules in a buck mode by controlling switching of at least one transistor, wherein the voltage is decreased; and
providing a substantially constant string voltage to an inverter.

30. The method of claim 29, further comprising operating each of the plurality of photovoltaic modules at a substantially maximum power point.

31. The method of claim 30, wherein each of the plurality of photovoltaic modules is autonomous.

32. The method of claim 31, further comprising controlling a string current of the plurality of photovoltaic modules, and wherein each of the plurality of photovoltaic modules comprises at least one photovoltaic cell and a DC/DC converter integrated into a photovoltaic package.

33. The method of claim 32, wherein the inverter determines the string current of the plurality of photovoltaic modules.

34. The method of claim 33, wherein operating at least one of the plurality of photovoltaic modules in the pass-through mode comprises operating a first photovoltaic module in the pass-through mode.

35. The method of claim 34, wherein operating at least one of the plurality of photovoltaic modules in the boost mode comprises operating the first photovoltaic module in the boost mode.

36. The method of claim 35, wherein operating at least one of the plurality of photovoltaic modules in the buck mode comprises operating the first photovoltaic module in the buck mode.

37. The method of claim 34, wherein operating at least one of the plurality of photovoltaic modules in the boost mode comprises operating a second photovoltaic module in the boost mode.

38. The method of claim 37, wherein operating at least one of the plurality of photovoltaic modules in the buck mode comprises operating a third photovoltaic module in the buck mode.

39. The method of claim 38, wherein operating the third photovoltaic module in the buck mode further comprises operating the third photovoltaic module in the buck mode when the third photovoltaic module is at least partially shaded.

40. The method of claim 38, wherein operating the second photovoltaic module in the boost mode further comprises operating the second photovoltaic module in the boost mode when the third photovoltaic module is at least partially shaded.

* * * * *